Patented Sept. 30, 1952

2,612,502

UNITED STATES PATENT OFFICE 2,612,502

EXTRACTION OF CYCLOHEXIMIDE

Byron E. Leach, Kalamazoo, Mich., assignor to The Upjohn Company, Kalamazoo, Mich., a corporation of Michigan No Drawing. Application February 17, 1947, Serial No. 729,201

10 Claims. (Cl. 260—281)

This invention relates to a new and useful biosynthetic antimicrobial material, and is more particularly concerned with a method for the isolation of the antibiotic material from a fermentation product containing the same.

It is known that an antibiotic can be obtained from a Streptomyces griseus fermented medium, for example, one which comprises glucose, meat extract, peptone, and sodium chloride. This antibiotic is characterised by its water solubility, ether insolubility, chloroform insolubility, and acid instability (Waksman et al., Proc. Soc. Biol. Med. 55, 66 (1940) and Proc. Staff Mayo Clinic 18, 537 (1944)); by its high activity toward Bacillus subtilis, Staphylococcus aureaus, and Escherichia coli; and by its low activity toward Saccharomyces cerevisiae, Cryptococcus neoformans, and Rhodotorula sp. It is further characterised by its optical rotation $[\alpha]_D^{26}$ —100 degrees, an empirical formula of $C_{21}H_{39}N_7O_{12}$ and by presence in the molecule of three basic groups, two of which are thought to be a part of a guanidine type structure and the third a more simple amine structure. This antibiotic has been designated "Streptomycin" and its structural formula is postulated at pages 56 and 57 of the book "Streptomycin: Nature and Practical Applications," edited by Selman A. Waksman, Baltimore, The Williams and Wilkins Co., 1949.

It has been found that, in addition to streptomycin, there is present in a Streptomyces griseus fermented medium, such as one comprising glucose, meat extract, peptone, and sodium chloride, another antibiotic substance which is characterised by its water solubility, ether solubility, chloroform solubility, and acid stability (Whiffen, Bohonos, and Emerson, J. Bact. 52 610 (1946)). This antibiotic is further characterised by its low activity toward Bacillus subtilis, Staphylococcus aureaus, and Escherichia coli, as well as by its high activity toward Saccharomyces cerevisiae, Cryptococcus neoformans, and Rhodotorula glutinis 2527. It is still further characterised by its optical rotation $[\alpha]_D^{26}$ —2.8 degrees, a melting point of 115–116 degrees centigrade, and the fact that it is a neutral substance and a ketone. This antibiotic has been designated "Cycloheximide" and it has been shown to have an empirical formula of $C_{15}H_{23}NO_4$ and to be beta-[2-(3,5-dimethyl-2-oxocyclohexyl)-2-hydroxyethyl]-glutarimide, having the following structural formula:

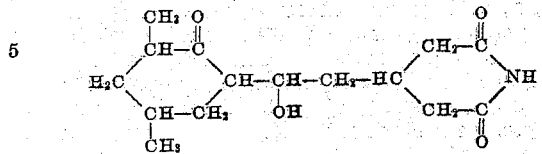

according to Kornfeld, Jones and Parke, J. Am. Chem. Soc., 1949, vol. 71, pages 150 to 159. Its melting point after further purification is 119.5–121 degrees centigrade and its optical rotation $[\alpha]_D^{29}$ is minus 3.38 (c=9.47 in ethanol). Cycloheximide is distinctly different from streptomycin, the trichomonadicidal substance isolated from mycelium of Streptomyces griseus by Selman A. Waksman et al., Proc. Soc. Exper. Biol. and Med., 1949, vol. 70, page 308, and is also disclosed and claimed in the copending application of Alma J. Whiffen, Robert L. Emerson and Nestor Bohonos, Serial 704,530, filed October 19, 1946, now Patent No. 2,574,519.

Customary procedures for the isolation of streptomycin from beers containing the same have, until the present invention, prevented the isolation of the cycloheximide from fermentation products containing the two antibiotics. No method has been at hand whereby both of the antibiotics could be separated from a Streptomyces griseus beer containing the same.

It is, therefore, an object of the present invention to provide a method whereby the isolation of both streptomycin and the cycloheximide, from fermentation products containing the same, may be accomplished without interference. Another object of the invention is the provision of a process whereby the cycloheximide may be isolated in high yields from byproducts of usual streptomycin extraction processes. A further object of the invention is the provision of a process whereby the cycloheximide may be extracted from the filter cake ordinarily discarded in a streptomycin extraction process. A broader object of the invention is the provision of a process whereby the cycloheximide may be extracted from a Streptomyces griseus fermentation beer containing the same. Another object of the invention is the provision of such a process wherein the isolation of the cycloheximide is accomplished from an acidic solution. An additional object of the invention is the provision of a process whereby the cycloheximide may be absorbed on activated carbon from an acid solution. A further object of the invention is the provision of a process whereby the cycloheximide may be adsorbed on activated carbon from an acid solution, and thereafter eluted by at least one member of the group consisting of water-miscible alcohols and ketones. Still a further object of the invention is the provision of a process for the recovery of the cycloheximide in a crystalline form. A still further object of the invention is the provision of such a process wherein the solvent employed for the crystallisation of the cycloheximide is a member of the group consisting of cyclohexene, amyl acetate, ethyl acetate, chloroform-petroleum ether, and ethyl ether-petroleum ether. Other objects of the invention will become apparent hereinafter.

According to usual procedure employed for the isolation of streptomycin, the filtrate obtained when a *S. griseus* fermented medium is clarified and filtered from mycelium is further treated to give streptomycin, while the filter cake is discarded as being of negligible value. This is customarily the first step in the isolation of streptomycin, and no consideration has been given to the possibility that the filter cake might have any value whatsoever. It has now been found that, according to the method of the present invention, the usually discarded filter cake from a streptomycin clarification is an excellent source of cycloheximide.

The process of this invention consists essentially in the treatment of an acidic liquid *S. griseus* fermentation product with activated carbon and elution of the active material therefrom. This is readily accomplished in commercial operation by employing the filter cake obtained from the treatment of a *S. griseus* fermentation beer with decolorising carbon (such as Nuchar C-190Nu) and a diatomaceous earth filter aid (such as Celite), and then filtering the mixture. The filter cake is treated with an alcohol or ketone, which is substantially completely water-miscible, to eluate the cycloheximide therefrom. Such water-miscible alcohols or ketones include acetone, methyl ethyl ketone, diethyl ketone, methanol, ethanol, propanol, isopropyl alcohol, butyl alcohol, and the like. The volatile solvent is removed from the eluate in vacuo and the aqueous residue is extracted with a chlorinated hydrocarbon solvent, preferably one which boils below about 100 degrees centigrade. Various chlorinated ethylenes and methanes are especially suitable, and chloroform is preferred. The chloroform or other extract is decolorised with a decolorising carbon and the chloroform removed, whereupon the cycloheximide remains. In some instances the cycloheximide may crystallise immediately, but it is usually advantageously further purified as, for example, by a counter-current distribution between benzene and water (Craig, J. Biol. Chem. 155, 519 (1944)) before crystallisation from a solvent. Amyl acetate, cyclohexene, petroleum ether, ethyl acetate, ethyl ether-petroleum ether, and chloroform-petroleum ether mixtures are especially suitable solvents for the crystallisation of cycloheximide. When pure, the cycloheximide melts at 115–116 degrees centigrade, and may be crystallised from water, but with crude preparations this is not the case.

While the cycloheximide may be obtained from acidic streptomycin beers by adsorption on activated carbon, chloroform extracts containing the substantially pure antibiotic material (obtained by elution from carbon with eighty per cent acetone, distillation of the acetone therefrom, and extraction of the residual aqueous solution with chloroform), may be decolorised with carbon. The fact that the cruder product may be isolated on activated carbon from an acid solution leads the way to this new method of separating both streptomycin and the cycloheximide from fermentation products containing the same.

Cycloheximide as obtained by the method of the present invention melts at 115–116 degrees centigrade, has an optical rotation $[\alpha]_D^{26}$ —2.8 degrees, forms in conventional manner an acetate M. P. 143–145 degrees centigrade, an oxime M. P. 203–204 degrees centigrade, a disemicarbazone M. P. 176–178 degrees centigrade. The bacterial spectra of the highly-purified cycloheximide is very similar to that previously reported by Whiffen, Bohonos, and Emerson for less purified material, the difference being solely in degree of activity.

The following examples are illustrative only, and are not to be construed as limiting the invention.

EXAMPLES

Pure cycloheximide is assigned an activity of 1000 micrograms per milligram. Assay of products containing the cycloheximide is by the paper disc plate method of Loo, Skell, Thornberry, Ehrlich, McGuire, Savage, and Sylvester, J. Bact. 50, 701 (1945), using *Saccharomyces pastorianus* ATCC 2336 as the test organism.

The type of acid or acids which may be present in the fermentation beer is of no significance. The pH of the liquid from which adsorption is accomplished is likewise unimportant, and it is merely necessary that it be not alkaline.

*Example 1*

Two hundred and twenty-five liters of acidic beer from a commercial streptomycin fermentation was extracted thrice with chloroform (22, 11, and 11 liters, respectively). The combined chloroform extracts were evaporated to dryness, the residue taken up in benzene and lyophylized. Yield, 8.3 grams assaying 830 micrograms of the cycloheximide per milligram.

*Example 2*

Four hundred and twenty liters of acidic beer from a streptomycin fermentation assaying 50 micrograms per milliliter, or 21.0 grams, of the cycloheximide was clarified with 1050 grams (0.25 per cent) of decolorising carbon (Nuchar C-190Nu) and 4200 grams (1 per cent) of a diatomaceous earth filter aid (Celite). This treatment completely removed the cycloheximide from the solution, and the filtrate was subjected to further treatment for the separation of streptomycin. Portionwise elution of the carbon-filter-aid-mycelium cake with acetone (46 liters total) gave 18.7 grams of the cycloheximide in the eluate, as calculated from an assay of a portion of the total eluate. The eluate was concentrated in vacuo to an aqueous residue having a volume of 7.6 liters and a pH of 2.8. The aqueous residue was extracted with three one-liter portions of chloroform, whereafter the combined extracts were treated with 285 grams of decolorising carbon to give an almost colorless solution. Evaporation of the chloroform gave 18.9 grams of an oil which could be crystallised directly. Crystallisations from a chloroform-petroleum ether mixture yielded 9.6 grams of the cycloheximide (45.7 per cent calculated from the amount present in the original beer). After three crystallisations, the melting point was 115–116 degrees centigrade. This material also crystallised satisfactorily from amyl acetate, cyclohexene, and ethyl acetate.

*Example 3*

Five hundred and five liters of acidic beer from a streptomycin fermentation were treated with 0.25 per cent carbon and 1 per cent filter aid as in Example 2. The filtrate was further treated to recover streptomycin, while the filter cake was eluted with methanol. The methanol eluate was then concentrated in vacuo and treated as in Example 2. The yield of material obtained after evaporation of chloroform was 10.0 grams assaying 540 micrograms of the cycloheximide per milligram.

*Example 4*

Nine hundred eighty milligrams of crude cycloheximide was dissolved in 40 milliliters of benzene and subjected to a 12-plate counter-current distribution in separatory funnels, using 40 milliliters of water as the traveling phase according to the method of Craig, J. Biol. Chem. 155, 519 (1944). The distribution coefficient is about 0.7, and the following table gives the result of such an extraction.

| No. | Vol., ml. | Wt., mg. | Assay | Remarks |
|---|---|---|---|---|
| 0 | 80 | 28 | 0 at 30 dilution. | |
| 1 | 80 | | | |
| 2 | 80 | 8 | 0 at 30 dilution. | |
| 3 | 80 | | | |
| 4 | 80 | 36 | active at 300 dilution. | |
| 5 | 80 | | | |
| 6 | 80 | 136 | active at 3,000 dilution. | Main active band. |
| 7 | 80 | | | |
| 8 | 80 | 164 | active at 3,000 dilution. | |
| 9 | 80 | | | |
| 10 | 80 | 80 | active at 1,000 dilution. | |
| 11 | 80 | | | |
| 12 | 80 | 212 | active at 30 dilution. | |

The main active fractions can be crystallised by dissolving in ether or chloroform after removal of the benzene therefrom, and thereafter pouring the solution into a large volume of hot petroleum ether or other crystallisation solvent. The resulting milky oil crystallises after thorough rubbing. Crystals may also be obtained by dissolving the product in hot cyclohexene, amyl acetate, ethyl acetate, and mixtures of petroleum ether with chloroform or ethyl ether. The purer preparation, after crystallisation from any of the above solvents, can be satisfactorily recrystallised from hot water.

Variations may be made without departing from the spirit or scope of the invention, and it is to be understood that I limit myself only as defined in the appended claims.

I claim:

1. A process for the recovery of cycloheximide from an acidic *Streptomyces griseus* fermentation beer, which comprises treating the beer with activated adsorptive carbon, eluting the adsorbed cycloheximide therefrom with at least one solvent of the group consisting of water-miscible alcohols and ketones, removing the eluting liquid, dissolving the cycloheximide-containing residue in water and extracting the cycloheximide from the aqueous solution with a chlorinated hydrocarbon solvent.

2. A process for the recovery of cycloheximide from an acidic *Streptomyces griseus* fermentation beer, which comprises treating the beer with activated adsorptive carbon, eluting the adsorbed cycloheximide therefrom with at least one solvent of the group consisting of water-miscible alcohols and ketones, removing the eluting liquid, dissolving the crude cycloheximide-containing residue in water and extracting the cycloheximide from the aqueous solution with a chlorinated hydrocarbon solvent, and crystallising the cycloheximide from a solvent therefor.

3. A process as defined in claim 2 in which the water-miscible eluting solvent is methanol.

4. A process as defined in claim 2 in which the water-miscible eluting solvent is acetone.

5. A process as defined in claim 2 in which the crystallization of cycloheximide is effected in a solvent of the group consisting of cyclohexene, ethyl acetate, amyl acetate, petroleum ether, mixtures of chloroform and petroleum ether, and mixtures of ethyl ether and petroleum ether.

6. A process as defined in claim 2 in which the eluting solvent is a member of the group consisting of acetone, methyl ethyl ketone, diethyl ketone, methanol, ethanol, propanol, isopropanol and butanol.

7. A process as defined in claim 2 in which the chlorinated hydrocarbon solvent is chloroform.

8. A process for the recovery of cycloheximide from an aqueous culture of the organism *Streptomyces griseus*, which comprises acidifying the culture to dissolve and retain in the liquid a substantial proportion of the streptomycin, adding activated adsorptive carbon to the acidified culture and subjecting it to absorptive treatment therewith, separating the solid mycelial growth together with the activated carbon from the main portion of the liquid, eluting the adsorbed cycloheximide from the activated carbon contained in the separated solids by extraction of the solids with at least one solvent of the group consisting of water-miscible alcohols and ketones and recovering cycloheximide from the elute.

9. A process for the recovery of cycloheximide from an aqueous culture of the organism *Streptomyces griseus*, which comprises acidifying the culture to dissolve and retain in the liquid a substantial proportion of the streptomycin, adding activated adsorptive carbon to the acidified culture and subjecting it to adsorptive treatment therewith, separating the solid mycelial growth together with the activated carbon from the main portion of the liquid, eluting the adsorbed cycloheximide from the activated carbon contained in the separated solids by extraction of the solids with acetone, and recovering cycloheximide from the eluate by evaporation of the acetone and extraction of the residue with chloroform.

10. A process for the recovery of cycloheximide from an aqueous culture of the organism *Strep-

*tomyces griseus*, which comprises acidifying the culture liquid to dissolve and retain therein a substantial proportion of the streptomycin contained therein, adding activated adsorptive carbon to the acidified culture liquid and subjecting it to adsorptive treatment therewith, separating the carbon from the liquid and eluting the cycloheximide adsorbed thereon with at least one solvent of the group consisting of water-miscible alcohols and ketones, and recovering cycloheximide from the eluate by removing the water-miscible solvent and extracting the residual aqueous solution with a chlorinated hydrocarbon solvent.

BYRON E. LEACH.

REFERENCES CITED

The following references are of record in the file of this patent:

UNITED STATES PATENTS

| Number | Name | Date |
| --- | --- | --- |
| 2,521,770 | Babson et al. | Sept. 12, 1950 |
| 2,532,403 | Howe et al. | Dec. 5, 1950 |

OTHER REFERENCES

Waksman in J. Bact. 51 p. 753–759 rec'd for publication Feb. 1946.

Carter in J. Biol. Chem. vol. 160 p. 337–342 (1945).

Schatz in Proc. Soc. Exp. Biol. Med. vol. 57 p. 244–248 (1944).

Waksman et al: J. Am. Pharm. Assoc. (Scientific Edition), vol. 34, page 276 (Nov. 1945).

Whiffen et al: J. Bact. vol. 52, p. 610 (1946).

Shriner and Fuson: "Identification of Organic Compounds" (John Wiley; New York; 1940). 2nd Ed., pages 142, 167, 221, and 222.